(12) United States Patent
Serlet

(10) Patent No.: US 9,176,871 B1
(45) Date of Patent: Nov. 3, 2015

(54) GARBAGE COLLECTION OF CHUNKS

(71) Applicant: upthere, inc., Palo Alto, CA (US)

(72) Inventor: Bertrand Serlet, Palo Alto, CA (US)

(73) Assignee: upthere, inc., Palo Alto, CA (US)

( * ) Notice: Subject to any disclaimer, the term of this patent is extended or adjusted under 35 U.S.C. 154(b) by 257 days.

(21) Appl. No.: 13/760,945

(22) Filed: Feb. 6, 2013

(51) Int. Cl.
*G06F 12/02* (2006.01)
*G06F 12/12* (2006.01)

(52) U.S. Cl.
CPC ........ *G06F 12/0269* (2013.01); *G06F 12/0253* (2013.01); *G06F 12/122* (2013.01); *G06F 2212/702* (2013.01); *G06F 2212/7205* (2013.01)

(58) Field of Classification Search
CPC .......... G06F 17/30902; G06F 12/0875; G06F 12/0253; G06F 17/30067; G06F 17/30215; G06F 12/0895; G06F 2221/2151; G06F 12/0269; G06F 12/0276; G06F 2212/702; G06F 2212/7205
See application file for complete search history.

(56) References Cited

U.S. PATENT DOCUMENTS

| | | | |
|---|---|---|---|
| 6,594,678 B1 * | 7/2003 | Stoutamire et al. | 1/1 |
| 7,535,485 B2 | 5/2009 | Elbaz et al. | |
| 7,836,267 B1 * | 11/2010 | Cross | 711/162 |
| 7,958,101 B1 * | 6/2011 | Teugels et al. | 707/705 |
| 8,095,542 B1 * | 1/2012 | Teugels et al. | 707/747 |
| 8,156,429 B2 | 4/2012 | Lotenberg | |
| 8,223,191 B2 | 7/2012 | Elbaz et al. | |
| 8,713,056 B1 * | 4/2014 | Wongkar et al. | 707/786 |
| 9,020,994 B1 * | 4/2015 | Hilliar et al. | 707/827 |
| 2002/0107880 A1 * | 8/2002 | Bacon | 707/206 |
| 2003/0191783 A1 * | 10/2003 | Wolczko et al. | 707/206 |
| 2003/0200392 A1 * | 10/2003 | Wright et al. | 711/118 |
| 2006/0294165 A1 * | 12/2006 | Bacon et al. | 707/206 |
| 2007/0022149 A1 * | 1/2007 | Bacon et al. | 707/206 |
| 2008/0086564 A1 * | 4/2008 | Putman et al. | 709/227 |
| 2008/0098186 A1 * | 4/2008 | Zhou et al. | 711/159 |
| 2008/0098412 A1 * | 4/2008 | Zhou et al. | 719/328 |
| 2008/0168103 A1 * | 7/2008 | Rakic | 707/200 |
| 2009/0327372 A1 * | 12/2009 | Ylonen | 707/206 |
| 2010/0058054 A1 | 3/2010 | Irvine | |

(Continued)

FOREIGN PATENT DOCUMENTS

| | | |
|---|---|---|
| CN | 101303669 A | 11/2008 |
| CN | 103294610 A | 9/2013 |
| JP | H0934791 A | 7/1997 |

OTHER PUBLICATIONS

Archiving Beyond File Systems: Object Storage EMC Centera and Disk Archival; Taneja Group; Jan. 2009.*

(Continued)

*Primary Examiner* — Nathan Sadler
*Assistant Examiner* — Paul Knight
(74) *Attorney, Agent, or Firm* — Hickman Palermo Becker Bingham LLP

(57) ABSTRACT

Various techniques are provided for performing garbage collection in a chunk store that is being used to implement a hierarchical file system. In general, the techniques involve a "trace" phase in which all chunks that correspond to current versions of files are marked, and then a sweep phase in which all chunks that were not marked during the trace phase are reclaimed. Various techniques are also described for using snapshots to avoid the need to halt operations on the file system while the trace phase is being performed. In addition, techniques are provided for using a cache of last-touched timestamps to avoid the need to mark all current chunks in each trace phase.

23 Claims, 8 Drawing Sheets

(56) References Cited

U.S. PATENT DOCUMENTS

| | | | |
|---|---|---|---|
| 2010/0064354 | A1 | 3/2010 | Irvine |
| 2010/0070698 | A1 | 3/2010 | Ungureanu et al. |
| 2010/0114997 | A1* | 5/2010 | Micic et al. .................. 707/813 |
| 2011/0010578 | A1 | 1/2011 | Agúndez Dominguez et al. |
| 2011/0264871 | A1 | 10/2011 | Koifman et al. |
| 2011/0307447 | A1 | 12/2011 | Sabaa et al. |
| 2012/0124105 | A1 | 5/2012 | Provenzano |
| 2012/0159098 | A1 | 6/2012 | Cheung et al. |
| 2012/0210120 | A1 | 8/2012 | Irvine |
| 2012/0215980 | A1 | 8/2012 | Auchmoody et al. |
| 2012/0221524 | A1 | 8/2012 | Auchmoody et al. |
| 2012/0300676 | A1 | 11/2012 | Welin et al. |
| 2012/0311339 | A1 | 12/2012 | Irvine |
| 2013/0061049 | A1 | 3/2013 | Irvine |
| 2013/0198462 | A1 | 8/2013 | Serlet et al. |
| 2013/0198475 | A1 | 8/2013 | Serlet et al. |

OTHER PUBLICATIONS

The Technology Management Handbook by Richard Dorf; CRC Press 1999, p. 9-7.*
Generational Real-Time Garbage Collection A Three-Part Invention for Young Objects, by Frampton, Bacon, and Grove; Springer 2007.*
A Distributed Garbage Collection Algorithm, John Hughes; Sweden 1985.*
The Authoritative Dictionary of IEEE Standards Terms; Published 2000.*
A simple spreadsheet-based, MIAME-supportive format for microarray data by Rayner published Jul. 2006.*
Time-Triggered Garbage Collection Robust and Adaptive Real-Time GC Scheduling for Embedded Systems by Roberz ACM 2003.*
Making a hash of file content by Chris Mellor, Dec. 2010.*
Assureon NX™ Easy Archive Appliance by Nexscan; No publicaiton date available (not used to show state of the art).*
The Memory Management Glossary; Letter G; As published on the internet on Feb. 4, 2012 at http://www.memorymanagement.org/glossary/g.html.*
"Content-Addressable Storage Wikipedia, the free encyclopedia" downloaded from the Internet: http://web.archive.org/web/20121113190903/http://en.wikipedia.org/wiki/Content-addressable_storage 2012 (4 pages).
Strzelczak, P. et al., "Concurrent Deletion in a Distributed Content-Addressable Storage System with Global Deduplication" downloaded from the Internet https://www.usenix.org/system/files/conference/fast13/fast13-final91.pdf *2013 USENIX Association* (pp. 161-174).
Ungureanu, C. et al., "HydraFS: a High-Throughput File System for the HYDRAstor Content-Addressable Storage System" downloaded from the Internet http://static.usenix.org/event/fast10/tech/full_papers/ungureanu.pdf *Feb. 2012 NEC Laboratories America* (14 pages).
Rhea, S. et al., "Fast, Inexpensive Content-Addressed Storage in Foundation" downloaded from the Internet http://zoo.cs.yale.edu/classes/cs426/2012/bib/rhea08fast.pdf *Proceedings of the 2008 USENX Annual Technical Conference* (14 pages).
Suzaki, K. et al., "Analysis of Disk Access Patterns on File Systems for Content Addressable Storage" downloaded from the Internet https://www.kernel.org/doc/ols/2011/ols2011-suzaki.pdf *2011 Linux Symposium* (13 pages).
Ghemawat, Sanjay, "The Google File System", dated Oct. 2003, ACM, 15 pages.
"Distributed Hash Table—Wikipedia, the free encyclopedia" downloaded from the Internet: http://web.archive.org/web/20120103125147/ http:/en.wikipedia.org/wiki/Distributed hash . . . Dec. 2011 (5 pages).
"Designing Rhino DHT—A fault tolerant, dynamically distributed, hash table—Ayende@ . . . " http:/web.archive.org/web//20120122041007/ http:/ayende.com/blog/3934/designing-rhino-. . . 2009 (9 pages).
Zhao, J. et al., "Achieving Reliability Through Reputation in a Wide-Area Network PHT Storage System" 2007 (8 pages).
The State Intelletual Property Office of the People's Republic of China, "Search Report" in application No. 2013100325456, dated May 26, 2015, 5 pages.
Claims in China application No. 2013100325456, dated May 2015, 4 pages.

* cited by examiner

GARBAGE COLLECTION OF CHUNKS

CROSS-REFERENCE TO RELATED APPLICATIONS

This application is related to U.S. patent application Ser. No. 13/358,742, filed Jan. 26, 2012, and to U.S. patent application Ser. No. 13/622,026, filed Sep. 18, 2012. The entire contents of both of which are hereby incorporated by reference as if fully set forth herein.

FIELD OF THE INVENTION

The present invention relates to replication and, more specifically, to techniques for efficiently performing garbage collection in a chunk store.

BACKGROUND

Information that is used to access a stored digital item is referred to herein as the "access key" of the stored item. In typical file systems, stored items are retrieved based on (a) the location at which the items are stored, and (b) a name or identifier of the items. For example, if a file named "foo.txt" is located in a directory named "c:\myfiles\text", then applications may use the pathname "c:\myfiles\text\foo.txt" as the access key to retrieve the file from the file system. Because conventional access keys are based on the location of the items being retrieved, the access keys change when the items are moved. In addition, each copy of an item has a different access key, because each copy is stored at a different location.

In contrast to conventional file systems, Content Addressable Storage (CAS) systems allow applications to retrieve items from storage based on a hash value that is generated from the content of the items. Because CAS systems perform storage-related operations on items based on the hash values generated for the items, and the hash values are based on the content of the items rather than where the items are stored, the applications that request the operations may do so without knowing the number or location of the stored copies of the items. For example, a CAS system may store multiple copies of an item X at locations A, B and C. An application that desires to retrieve item X would do so by sending to the CAS system a hash value that is based on the contents of item X. Based on that hash value, the CAS system would provide to the application a copy of item X retrieved from one of the locations A, B, and C. Thus, the application would obtain item X without knowing where item X was actually stored, how many copies of item X existed, or the specific location from which the retrieved copy was actually obtained.

Storing a digital item, such as a file or a message, often involves making a call to a "chunk storage system" or "chunk store". A chunk storage system is a storage system that performs storage operations without understanding the format or content of the digital information itself. Such storage systems are referred to as chuck storage systems or chunk stores because the systems treat all forms of digital items as if those items were merely opaque chunks of data. For example, the same chunk storage system may be used by word processing applications, image management applications, and calendaring systems to respectively store documents, images and appointments. However, from the perspective of the chunk storage system, only one type of item is being stored: opaque chunks of digital information.

Chunk storage systems may be implemented as CAS systems. For example, a chunk storage system may generate a hash value for a chunk by applying a cryptographic hash function (e.g. MD5, SHA-1 or SHA2) to the chunk. The chunk store may then store the chunk, and maintain an index that associates the hash value with the location at which the chunk is stored. When an application subsequently requests retrieval of the chunk, the application provides the hash value to the chunk storage system. The chunk storage system uses the index to locate the chunk associated with the hash value, and provides the chunk thus located to the requesting application.

Chunks may be used to represent a file system hierarchy, where some chunks correspond to folders/directories of the file system hierarchy, and other chunks correspond to files that are stored in those folders/directories. FIG. 1 illustrates such a hierarchy. The hierarchical relationship illustrated in FIG. 1 has two non-overlapping trees, one of which is rooted at chunk 104, and the other of which is rooted at chunk 106. However, it is also possible for any given chunk or sub-tree of chunks to belong to multiple trees within the hierarchy. A hierarchical arrangement in which any given node (e.g. chunk) may belong to multiple trees is referred to as a Direct Acyclic Graph ("DAG"). The techniques described herein are equally applicable to chunk stores that represent DAG hierarchies as chunk stores that represent non-overlapping tree hierarchies.

Referring to FIG. 1, it illustrates a file system hierarchy implemented by chunks. In FIG. 1, the chunks are arranged in a manner that reflects the hierarchical relationship between the files represented by the chunks. For example, in the hierarchy, a file B resides in the directory "PPTS" which is a child of the directory "DOCS", which in turn is a child of the directory "JACK", which is the root directory for Jack's account. Consequently, the chunk 122 that corresponds to File B is shown as a child of chunk 116 that corresponds to directory "PPTS". Similarly, chunk 116 is shown as a child of chunk 114 that corresponds to directory "DOCS", chuck 114 is shown as a child of chunk 104 that corresponds to root directory "JACK".

While the arrangement of chunks in FIG. 1 reflects the hierarchical relationship between the files to which the chunks correspond, the actual arrangement of the chunks within a chunk store may have no relationship to that hierarchy. For example, the chunks may be randomly distributed across several storage devices. Thus, the arrangement illustrated in FIG. 1 is merely to facilitate understanding of the techniques described herein.

When a file system hierarchy is implemented using a chunk store, the addition or modification of a single file may necessitate changes to every file that is above that file in the hierarchy. Specifically, because the files are implemented by chunks that are addressed based on content, the modification of the single file causes creation of new chunks for every file that is above the file in the hierarchy.

For example, assume that a user updates file B, represented by chunk 122. Because the update to file B changes the content of the chunk, and chunks are addressed based on content, the new chunk is not simply stored over the chunk 122 that had the prior version of file B. Rather, the modified version of file B constitutes a new chunk, which is stored separate from chunk 122.

FIG. 2 is a block diagram that illustrates the new chunks that are produced in response to the update to file B. Referring to FIG. 2, the new version of file B is stored in chunk 222. Because File B is stored in a new chunk, the chunk 116 that corresponds to the directory "PPTS" in which File B resides must also be updated to point to the new chunk 222 for File B. The updated file for the directory "PPTS" is stored as chunk 216. Similarly, the chunk 114 that corresponds to the directory "DOCS" that is the parent of "PPTS" must also be updated to point to the new chunk for the "PPTS" directory. The updated file for "DOCS" is stored as chunk 214. For similar reasons, a new chunk 204 is stored for the root directory "JACK" that is the parent of "DOCS".

As a consequence of the update to file B, several chunks have become "stale". A stale chunk is a chunk whose data no longer reflects the current state of the file system. In the example given above, the update to file B causes chunks 104, 114, 116 and 122 to become stale. The more updates that are performed, the more chunks become stale.

When a chunk store is used to implement a hierarchical file system, a name store may be used to maintain an association between each file name and the hash of the chunk that currently represents the file. For example, prior to the update to file B, the name store would include the following associations:

"JACK"=>hash of chunk 104
"DOCS"=>hash of chunk 114
"PPTS"=>hash of chunk 116
"FILE B"=>hash of chunk 122

After the update to file B, the name store would include the following associations:

"JACK"=>hash of chunk 204
"DOCS"=>hash of chunk 214
"PPTS"=>hash of chunk 216
"FILE B"=>hash of chunk 222

Because the name store only points to the chunks that correspond to the most recent versions of files, some stale chunks may become unused. The process of identifying which chunks are stale, and then recovering the space those stale chunks occupy so that it may be reused, is referred to as garbage collection (GC). Given the rate at which stale chunks may proliferate when a chunk store is used as a file system, it is critical that the garbage collection process used by the chunk store be fast and efficient.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Various techniques are provided for performing garbage collection in a chunk store that is being used to implement a hierarchical file system. In general, the techniques involve a "trace" phase in which all chunks that correspond to current versions of files (the "current chunks") are marked, and then a "sweep" phase in which all chunks that were not marked during the trace phase (the "stale chunks") are reclaimed.

In one embodiment, marking the current chunks involves performing "touch" operations on the chunks, which results in establishing new "last-touch timestamps" for each touched chunk. In such an embodiment, the sweep phase involves reclaiming all chunks that have last-touch timestamps that reflect a time that is before the marking operation began.

Various techniques are also described for avoiding the need to halt operations on the file system while the trace phase is being performed. In addition, techniques are provided for avoiding the need to mark all current chunks in each trace phase. By reducing the number of chunks that need to be marked in each trace phase, garbage collection may be performed significantly faster than where all current chunks must be marked in every trace phase.

Simple Approach to Garbage Collection

Figure 3:
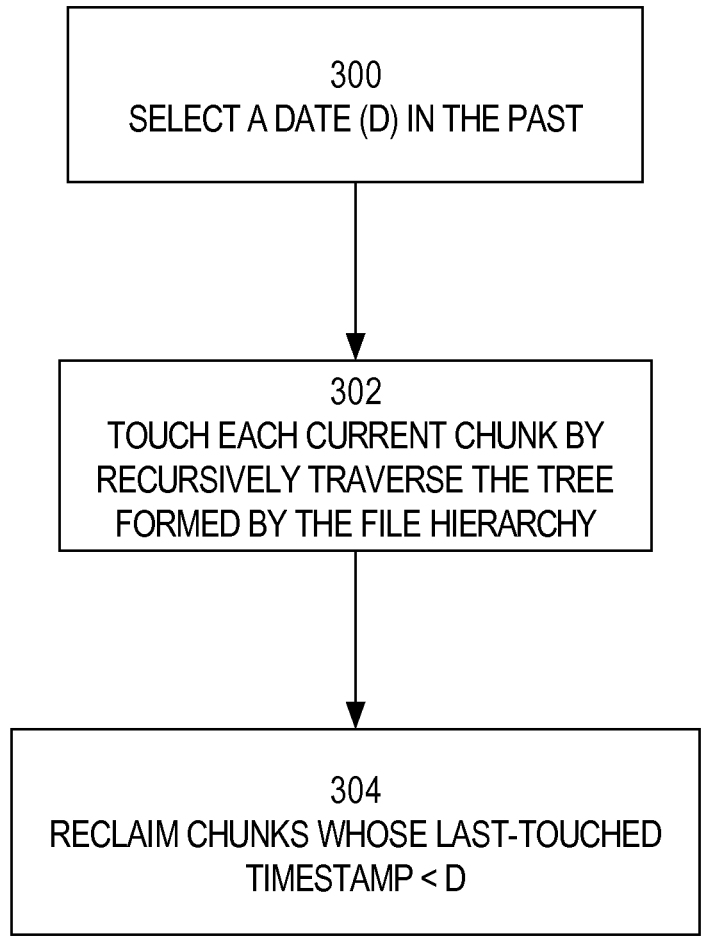
FIG. 3 is a flowchart illustrating steps for performing garbage collection, according to an embodiment of the invention.

FIG. 3 is a flowchart that illustrates a simple approach to garbage collection in a chunk store that is used to implement a hierarchical file system. Referring to FIG. 3, at step 300, a date "D" in the past is selected. The date "D" is the standard by which the staleness of chunks is determined. Specifically, chunks that have not been used/touched subsequent to the selected date D are considered to be "stale", and therefore subject to reclamation during the garbage collection operation. In step 302, the trace phase is performed. Specifically, each current chunk is touched by recursively traversing the tree formed by the file hierarchy.

Figure 2:
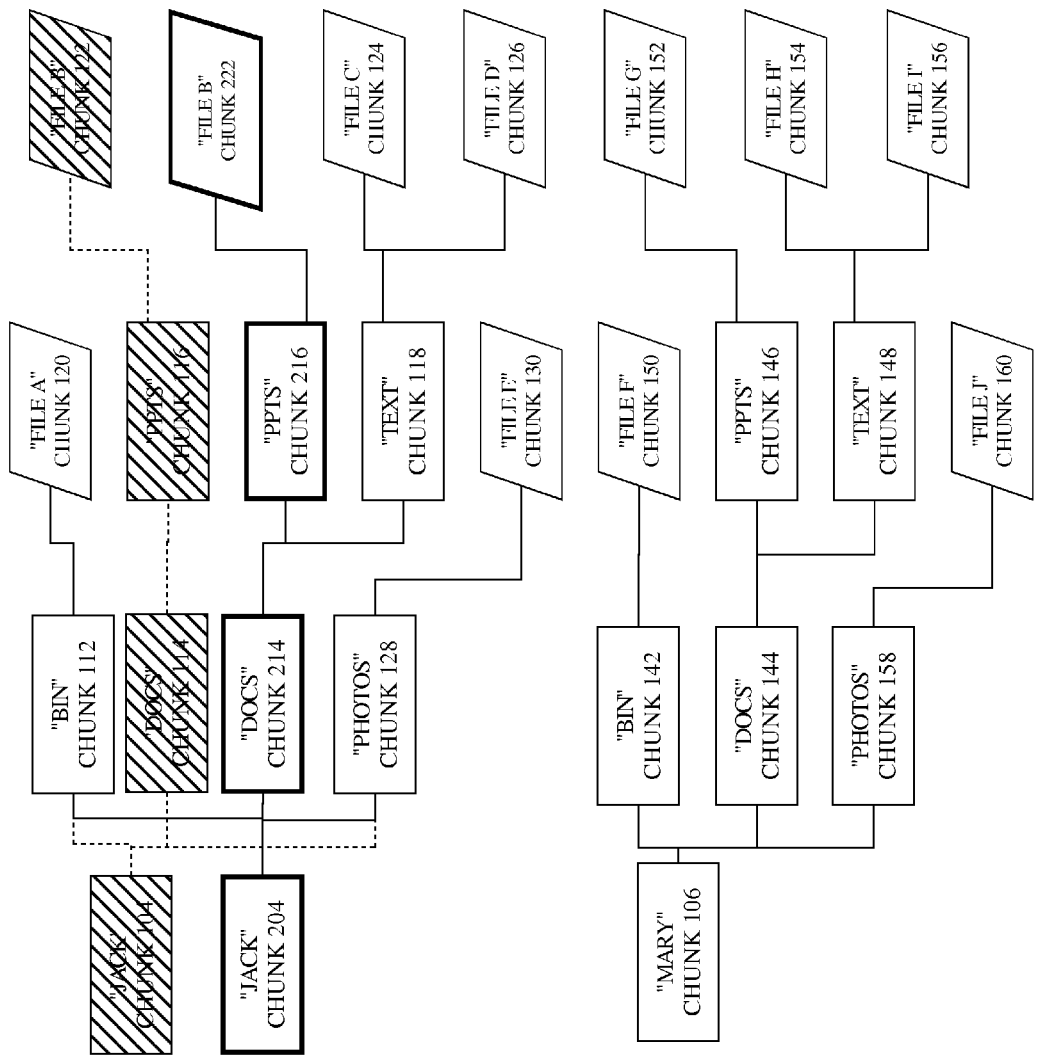
FIG. 2 is a block diagram illustrating chunks created in response to an update to a file.

For example, assume that the current state of the chunk store is as illustrated in FIG. 2. The chunk that corresponds to the current version of the root node is chunk 202. By recursively traversing the tree that corresponds to Jack's account, starting with chunk 202, each current chunk in that tree will eventually be visited and no stale chunks will be visited. As each current chunk is visited during the recursive touch-traversal operation, the chunk is "touched", thereby establishing a last-touch timestamp for the chunk that is greater than D.

The same touch-traversal operation may be repeated for each such distinct tree in the hierarchical file system. For example, starting with chunk 106, a touch-traversal operation may be performed to touch all current chunks that correspond to Mary's account.

In the specific hierarchy illustrated in FIG. 2, a depth-first touch-traversal operation of Jack's tree may proceed as follows: chunk 204 (the root node for Jack's account), chunk 112 (the first child of chunk 204), chunk 120 (the first child of chunk 212), chunk 214 (the second child of chunk 204), chunk 216 (the first child of chunk 214), chunk 222 (the first child of chunk 216), chunk 118 (the second child of chunk 214), chunk 124 (the first child of chunk 118), chunk 126 (the second child of chunk 118), chunk 128 (the third child of chunk 204), chunk 130 (the first child of chunk 128).

Figure 1:
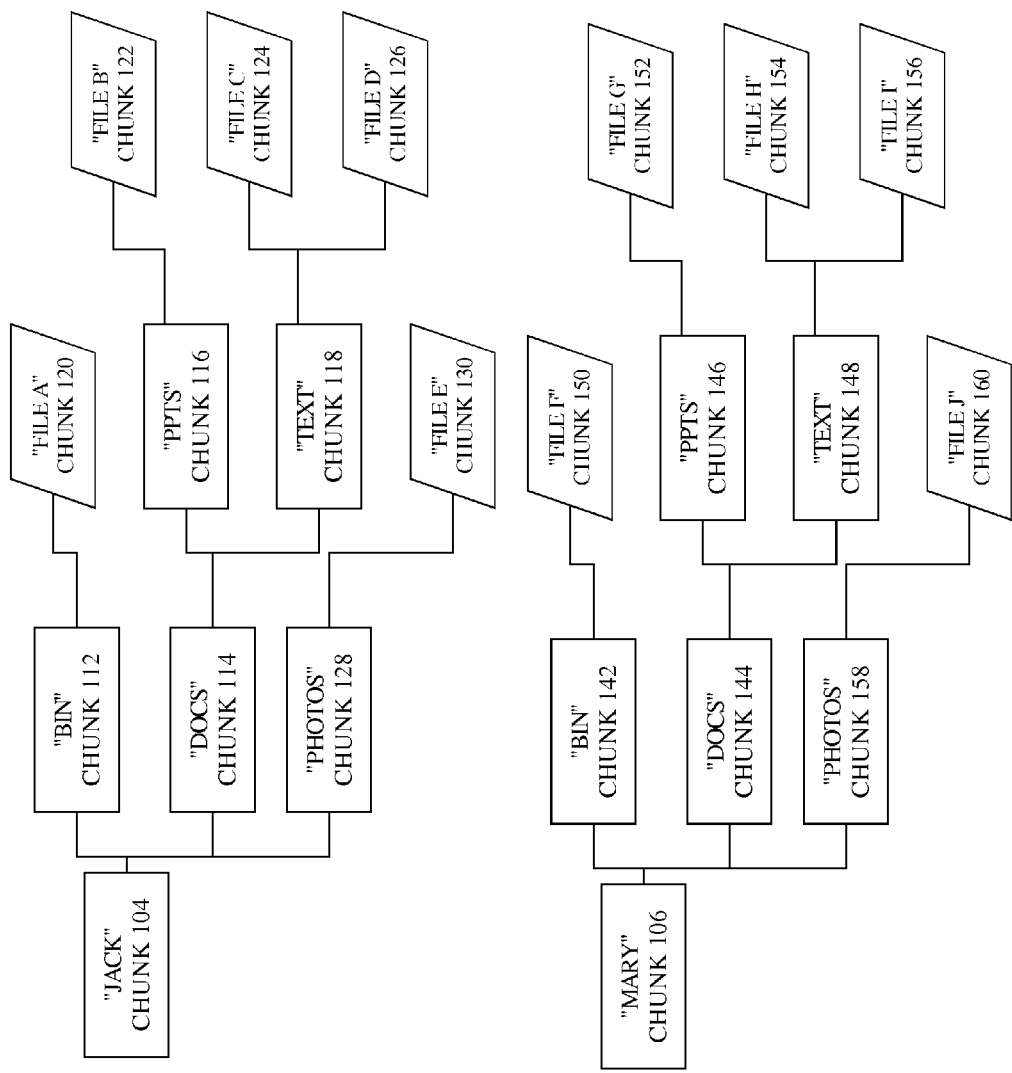
FIG. 1 is a block diagram illustrating chunks that implement a hierarchical file system.

Touch-traversal operation of the chunks that correspond to Mary's account would proceed in a similar manner, beginning with the root node (chunk 106) of the tree that corresponds to Mary's account. While FIGS. 1 and 2 illustrate a file system hierarchy in which there are only two user accounts (and therefore only two corresponding root nodes), the actual number of root nodes in a file system hierarchy will vary from situation to situation, and may become arbitrarily high.

Significantly, the chunks that had become stale due to the update to file B (i.e. chunks 104, 114, 116 and 118) are not visited during the recursive touch-traversal operation because none of those chunks belong to the tree of any current node. Consequently, the last-touch timestamp for each of those nodes will not have been updated during the trace phase, and will therefore be less than D.

When the trace phase has ended and all current chunks have been touched, the sweep phase may begin. Specifically, at step 304, all chunks with a last-touch timestamp less than D are reclaimed. In the present example, step 304 would involve reclaiming chunks 104, 114, 116 and 118.

Drawbacks of the Simple Approach

Unfortunately, there are several drawbacks to the simple approach illustrated in FIG. 3. For example, updates to the file system must be halted when enumerating the roots that must be traversed. The need to halt updates during the root enumeration is illustrated by the following scenario.

Assume that, at the start of the trace phase, the root file "Joe" corresponds to a chunk A, and the root file "Mary" corresponds to a chunk B. During the trace phase, the chunk A is "touched" because it is the current chunk for "Joe". However, after chunk A is touched, because updates have not been halted, "Joe" may be updated to correspond to chunk B, while "Mary" is updated to correspond to a new chunk C. After Mary has been updated, the tree associated with "Mary" may be traversed, thereby touching chunk C. At the end of the trace phase, chunk A has been marked even though it is no longer a current chunk, and chunk B has not been marked even though chunk B is the current chunk for Joe.

To avoid situations, such as the one described above, where current chunks are missed during the trace phase, updates to the system may be halted during the process of enumerating the roots that must be traversed. In some situations, such as that illustrated in FIGS. 1 and 2 where there are very few roots, halting the system during root enumeration would not result in too significant of a performance penalty. However, as mentioned above, in many situations there may be a very high number of roots. Consequently, enumerating all the roots recursively may take a very long time, and halting the system for the duration of the root enumeration may significantly degrade performance.

Note that, even in the simple approach illustrated in FIG. 3, the sweeping phase is fast because the "sweep" order may be sent in parallel to all machines that hold chunks. For example, if the chunks are spread across ten computer systems, each of which have five storage devices, the sweep may be performed across all fifty storage devices in parallel. In addition, sweep operations are fault tolerant in that, if the sweep operation is aborted in any of the machines, the only consequence is that some otherwise stale chunks are not reclaimed. Any such stale chunks will simply be reclaimed in a subsequent garbage collection operation.

Using Snapshots to Avoid System Halt

According to one embodiment, "snapshots" are used to avoid the need to halt the system during root enumeration. Specifically, from time to time, a snapshot is taken of the name store. Each snapshot of the name store records the state of the name store as of the particular point in time the snapshot is taken. For example, consider the name store associated with the chunks illustrated in FIGS. 1 and 2. A snapshot SS1 of that name store taken at a time T1 before file B is updated would include the following:

"JACK"=>hash of chunk 104
"DOCS"=>hash of chunk 114
"PPTS"=>hash of chunk 116
"FILE B"=>hash of chunk 122

On the other hand, a snapshot SS2 of that name store taken at time T2 after the update to file B would include the following:

"JACK"=>hash of chunk 204
"DOCS"=>hash of chunk 214
"PPTS"=>hash of chunk 216
"FILE B"=>hash of chunk 222

For the purpose of performing the trace phase of a garbage collection operation, the snapshot need only include those name store entries that correspond to root chunks. In the hierarchical file system illustrated in FIG. 2, there are only two root directories (i.e. "JACK" and "MARY"). Consequently, for the purpose of performing the trace phase, the snapshot SS1 need only contain the two entries:

"JACK"=>hash of chunk 104
"MARY"=>hash of chunk 106

Similarly, the snapshot SS2 need only contain the two entries:

"JACK"=>hash of chunk 204
"MARY"=>hash of chunk 106

Using snapshots, the trace phase of the garbage collection may be modified such that roots are enumerated based on a snapshot, rather than on the current state of the name store. Specifically, to garbage collect chunks that are stale as of a particular time D, a snapshot is chosen whose snapshot time is more recent than D. Using that snapshot, the chunks that were "current" as of the snapshot are touched by initiating recursive touch-traversal operations at the root chunks indicated in the snapshot. For example, if snapshot SS1 is selected, then recursive touch-traversal operations start at chunks 104 and 106. On the other hand, if snapshot SS2 is selected, then recursive touch-traversal operations start at chunks 204 and 106.

Because the recursive touch-traversal operations of the trace phase are performed based on a snapshot, the system may freely evolve during the trace phase of the garbage collection operation. That is, updates to the system need not be halted during the recursive touch-traversal operations that are performed to "touch" the current chunks.

Because the snapshot time of the snapshot that is used to perform the touch-traversal operations is after D, it is guaranteed that no current chunks will be reclaimed during the sweep phase. Specifically, all current chunks will either have been (a) touched after D during the touch-traversal operations that were based on the snapshot, or (b) stored/touched after the time associated with the snapshot. Because the sweep reclaims only those chunks whose last-touched time is less than D, and D is before the time associated with the snapshot, no current chunk will be reclaimed.

Figure 4:
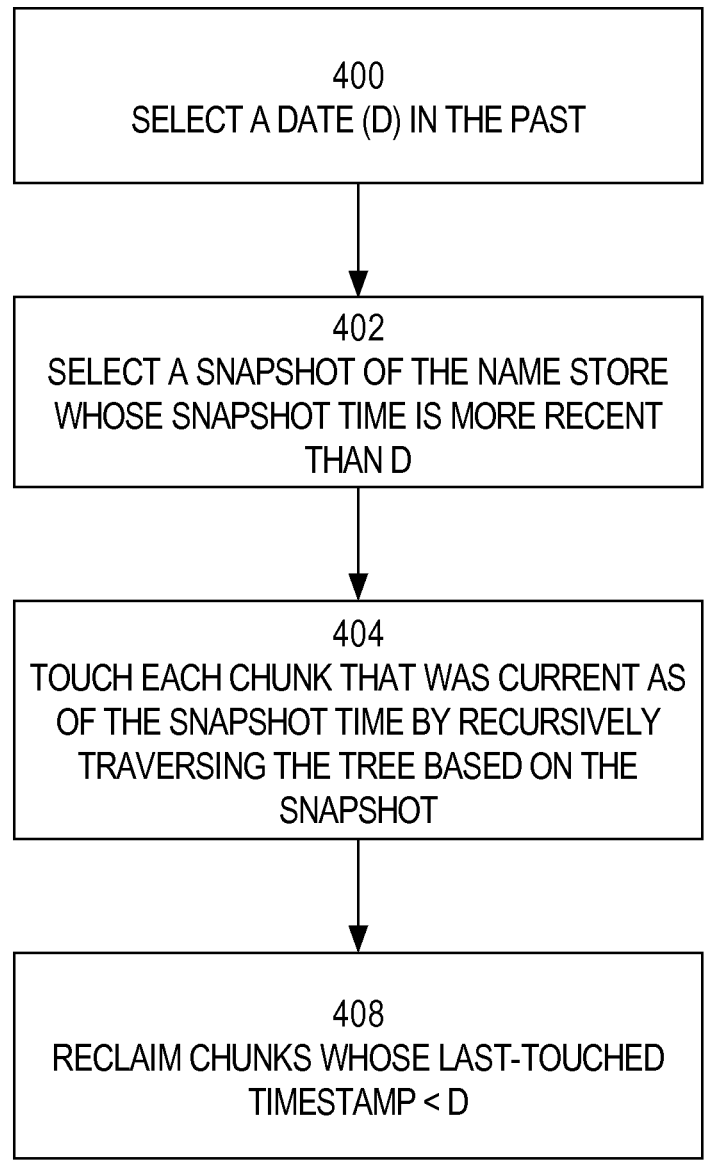
FIG. 4 is a flowchart illustrating steps for performing garbage collection using a snapshot of a name store, according to an embodiment.

FIG. 4 is a flowchart illustrating the steps of performing garbage collection using a snapshot of the name store to avoid halting the system during the trace phase. Referring to FIG. 4, at step 400, a date (D) in the past is selected. Because the recursive touch-traversal operation is to be performed based on a snapshot, D must be older than the most recent snapshot.

At step 402, a snapshot of the name store is selected whose snapshot time is more recent than D. For the purpose of illustration, it shall be assumed that, in step 400, a time T1 is selected to be D, and that, in step 402, a snapshot associated with time T2 is selected, wherein T2 is more recent than T1.

At step 404, each chunk that was current as of the snapshot time (T2) is touched by recursively traversing the file hierarchy tree beginning at each of the roots indicated in the selected snapshot.

At step 408, the sweep phase is performed by reclaiming chunks whose last-touched timestamp is less than T1.

Last-Touched Timestamps within Each Sub-Tree

As mentioned above, the touch-traversal operation of each tree within the hierarchical directory proceeds from the chunk that is the root of the tree. In one embodiment, the traversal proceeds down the tree, such that parent chunks are always touched before their child chunks. Consequently, when the touch-traversal operation of any sub-tree is completed, it is guaranteed that the last-touched timestamp of all chunks that reside below the root of the sub-tree will have last-touched timestamps that are at least as recent as the last-touched timestamp of that root. More specifically, when the touch-traversal operation of any sub-tree is complete, if chunk X resides below chunk Y in the sub-tree, then the last-touched timestamp of chunk X>=the last-touched timestamp of chunk Y.

For example, once the sub-tree that is rooted at chunk 104 in FIG. 1 has been completely traversed, every chunk below chunk 104 (i.e. chunks 112, 120, 114, 116, 122, 118, 124, 126, 128 and 130), will have a last-touched timestamp that is at least as recent as the last-touched timestamp of chunk 104. Similarly, every chunk below chunk 112 (i.e. chunk 120) will have a last-touched timestamp that is at least as recent as the last-touched timestamp of chunk 112. This same relationship is true for all sub-trees within the file hierarchy.

As shall be described in greater detail below, this relationship between last-touched timestamps of chunks in a sub-tree may be used to further improve performance of garbage collection operations.

Cache of Sub-Tree-Timestamps

Even when name store snapshots are used to avoid halting the system during the trace phase, the trace phase may negatively impact performance simply due to the amount of work that must be performed to recursively traverse arbitrarily large file system hierarchies. Therefore, according to one embodiment, a cache of sub-tree-timestamps (STT cache) is maintained in order to reduce the number of chunks that are traversed during the trace phase.

According to one embodiment, each entry in the STT cache has the form (hash, sub-tree-timestamp). The hash in an STT cache entry indicates a chunk that is the root of a sub-tree. The sub-tree-timestamp in an STT cache entry indicates a time that is known to pre-date the last touch date of all the chunks accessible from that sub-tree. For example if D is a chunk denoting a directory that references a file chunk F, and if the last touched date for D is 3:33 PM and for F is 2:22 PM, then the sub-tree-timestamp in the STT cache for D can be 2:00 PM or 2:22 PM, but no time that is after 2:22 PM. After the entire sub-tree that is rooted in a chunk is traversed and touched, an entry for the chunk is stored in the STT cache. The entry identifies the chunk (e.g. by the hash value of the chunk), and specifies a sub-tree-timestamp for the sub-tree that is rooted in the chunk.

As explained above, because the touch-traversal operation of the sub-tree was completed, the other chunks that belong to the sub-tree that is rooted in that chunk will have last-touched timestamps that are at least as recent as the last-touched timestamp indicated in that STT cache entry for that chunk. For example, if the STT cache entry is (hash of chunk 104, T1), then it is guaranteed that every chunk below chunk 104 (i.e. chunks 112, 120, 114, 116, 122, 118, 124, 126, 128 and 130), will have a last-touched timestamp that is at least as recent as time T1. Consequently, in one embodiment, the sub-tree-timestamp that is stored in the STT cache for a sub-tree is the last-touched timestamp that was assigned, during a touch-traversal operation, to the chunk that is the root of the sub-tree at the completion of the touch-traversal operation of the sub-tree.

Figure 5:
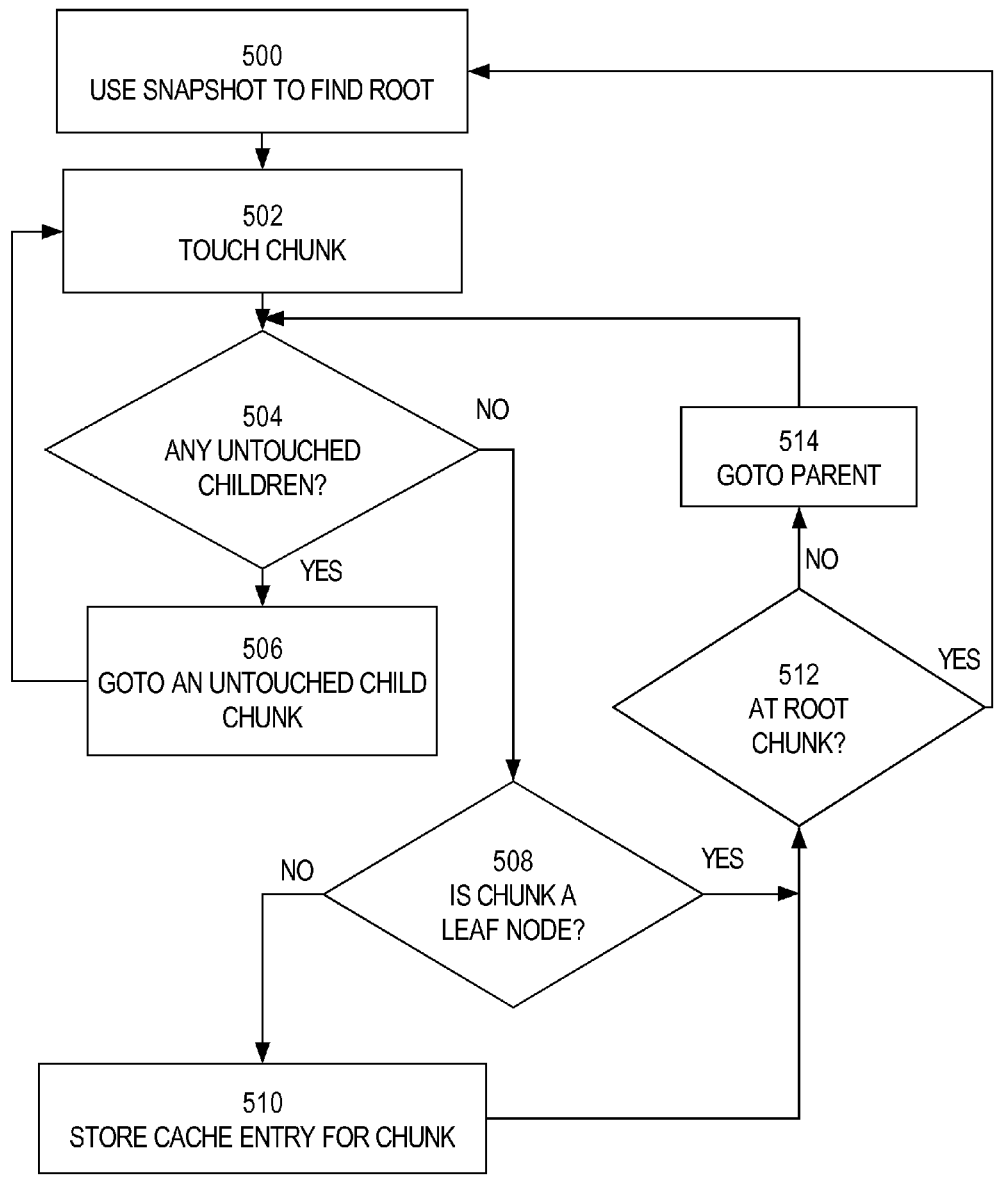
FIG. 5 is a flowchart illustrating steps for pro-actively performing a touch-traversal operation, according to an embodiment of the invention.

The process of populating the STT cache is illustrated in FIG. 5. Referring to FIG. 5, at step 500, a snapshot of the name store is used to find a chunk that serves as the root of a tree in the hierarchy. For example, the snapshot may indicate that Jack's file hierarchy is rooted at chunk 104, illustrated in FIG. 1. After a root chunk is identified, control passes to step 502 and the chunk is touched. After the chunk is touched, at step 504 a determination is made as to whether the chunk has any untouched children. If the chunk has any untouched children, then at step 506 the touch-traversal operation proceeds to one of the untouched children.

Steps 502, 504 and 506 form a loop that is repeated, traversing down the tree, until the touch-traversal operation arrives at a chunk that has no children. At that point, control passes from step 504 to step 508. At step 508, it is determined whether the current chunk is a leaf-node (i.e. has no children). If the current chunk is a leaf node, then control proceeds to step 512. On the other hand, if the current chunk is not a leaf node, then the chunk is the root of a sub-tree whose traversal has just been completed. Consequently, at step 510 a STT cache entry is stored for that chunk. As mentioned above, the STT cache entry will identify the chunk (e.g. by the chunk's hash), and indicate a sub-tree-timestamp for the sub-tree that is rooted in the chunk.

After the STT cache entry for a chunk is stored in step 510, control proceeds to step 512. At step 512, it is determined whether the current chunk is the root chunk of an entire directory tree (i.e. a chunk that has no parent). If the chunk is not a root chunk, then at step 514 the touch-traversal operation proceeds up the tree to the current chunk's parent. On the other hand, if the current chunk is a root chunk, then control proceeds to step 500 and a new root is selected using the snapshot. This process continues until touch-traversal operations have been completed for all root chunks.

When, at step 514, the touch-traversal operation proceeds to the current chunk's parent, control passes to step 504 where it is determined whether the current chunk has any untouched children. Again, the loop defined by steps 502, 504 and 506 is repeated to traverse down the sub-tree while touching each chunk along the way. Thus, touch-traversal operation below any given chunk stops when either (a) the chunk has no children, or (b) all chunks below the chunk have been touched. At that point, the STT cache entry for the chunk is added to the STT cache if the chunk is not a leaf node.

In the embodiment illustrated in FIG. 5, STT cache entries are only added for chunks that correspond to non-leaf nodes. However, in alternative embodiments, STT cache entries may be added for all chunks, only for the root chunks, or only for chunks that correspond to directories. Restricting the STT cache to only root chunks, to only non-leaf chunks, or to only directory chunks, significantly decreases the size of the STT cache, thereby improving performance. In addition, entries within the STT cache may be discarded when the STT cache grows too big. When selecting which cache entries to discard, one factor may be the size of the sub-trees that correspond to the entries. For example, all else being equal, the entry that corresponds to a small sub-tree may be discarded before an entry the corresponds to a large sub-tree. It should be noted that using the STT cache to effectively skip the touch-traversal of some sub-trees during the trace phase of a garbage collection operation produces correct results whether the hierarchy in question is a set of non-overlapping trees, or a DAG in which some chunks and sub-trees belong to multiple trees.

Pro-Active Touch-Traversal Operations

Rather than performing the touch-traversal operation illustrated in FIG. 5 as part of a garbage collection operation, touch-traversal operations may be performed pro-actively so that, when the time comes to perform a garbage collection operation, the work involved in trace phase of the garbage collection operation is significantly reduced.

For example, a pro-active touch-traversal operation, such as the one illustrated in FIG. 5, may be performed on a daily or hourly basis, while garbage collection itself may take place at a much lower frequency. Instead of or in addition to performing pro-active touch-traversal operations at set intervals, touch-traversal operations may be triggered by system conditions. For example, when usage of a particular tree of the file system falls below a certain threshold, a pro-active touch-traversal operation may automatically be performed on that tree if the last-touched time of the tree's root is older than a certain threshold.

Due to pro-active performance of touch-traversal operations, the entries in the STT cache will generally have more recent sub-tree-timestamps than they would have in the absence of pro-active touch-traversal operations. As shall be explained in greater detail below, the more recent the sub-tree-timestamps in the STT cache entries, the more likely the sub-trees that correspond to the cache entries may be skipped during the trace phase of a garbage collection operation. The more sub-trees that are skipped during the trace phase, the less work required by the trace phase, and the faster the garbage collection can be performed.

Using the STT Cache to Reduce Work During Garbage Collection

As mentioned above, the STT cache may be used to significantly reduce the work performed during the trace phase of a garbage collection operation. Specifically, during the trace phase of a garbage collection operation, before traversing below a directory chunk, the STT cache is checked to see if the STT cache contains an entry for the chunk. If the STT cache contains an entry for the chunk, and the entry indicates a sub-tree-timestamp that is more recent than the time (D) that is being used by the garbage collection operation to determine what qualifies as "stale", then no touch-traversal operation is made of any chunks that reside below that chunk.

Figure 6:
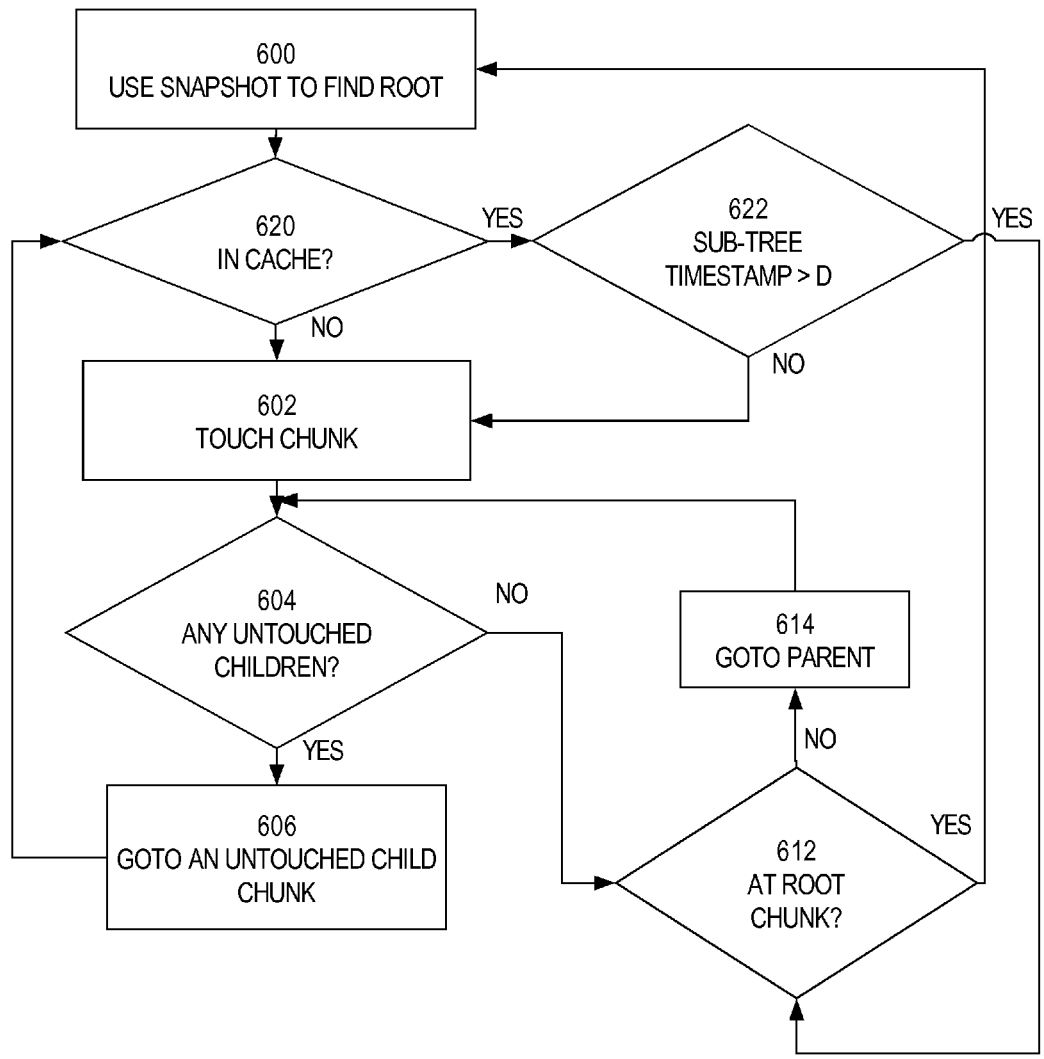
FIG. 6 is a flowchart illustrating steps for using a last-touched timestamp cache to reduce work during the trace phase of garbage collection, according to an embodiment.

FIG. 6 is a flowchart illustrating the trace phase of a garbage collection operation, according to one embodiment. Referring to FIG. 6, at step 600, a snapshot is used to find a chunk that serves as the root of a tree in the hierarchy. For example, the snapshot may indicate that Jack's file hierarchy is rooted at chunk 104, illustrated in FIG. 1. After a root chunk is identified, control passes to step 620 where the STT cache is checked for an entry for the current chunk (i.e. chunk 104). If there is no entry, then control passes to step 602. If there is an entry, but the sub-tree-timestamp in the entry is before D, then control also passes to step 602.

For the purpose of discussion, it shall be assumed that the STT cache has no entry for chunk 104. Therefore, control passes to step 602. At step 602, the chunk is touched. After the chunk is touched, at step 604 a determination is made as to whether the chunk has any untouched children. If the chunk has any untouched children, then at step 606 the touch-traversal operation proceeds to one of the untouched children.

In the present example, the touch-traversal operation has not yet touched any of the children of chunk 104. Therefore, at step 606, the touch-traversal operation may proceed to chunk 112. After traversing to a child, control proceeds back to step 620.

At step 620, the STT cache is checked for an entry for the current chunk (i.e. chunk 112). If there is no entry, then control passes to step 602. If there is an entry, but the sub-tree-timestamp in the entry is before D, then control also passes to step 602.

For the purpose of discussion, it shall be assumed that the STT cache has an entry for chunk 112, and that the entry has a sub-tree-timestamp that is more recent than N. That means that chunk 112, and all chunks that reside below chunk 112 in the hierarchy, have last-touched timestamps that are more recent than N. Consequently, those chunks will be skipped in the sweep phase even if not re-touched during the current trace phase. Because those chunks are already "safe" from being reclaimed, no further touch-traversal operation of that sub-tree is performed, and control passes to step 612.

At step 612, it is determined whether the current chunk is the root chunk (i.e. a chunk that has no parent). If the chunk is not the root chunk, then at step 614 the touch-traversal operation proceeds up the tree to the current chunk's parent. On the other hand, if the current chunk is the root chunk, then control proceeds to step 600 and a new root is selected using the name store.

In the present example, the current chunk (chunk 112) is not the root chunk, so control proceeds to step 614 where the touch-traversal operation returns back to chunk 104. Control then proceeds to step 604. At step 604 a determination is made as to whether the current chunk (i.e. chunk 104) has any untouched children. If the chunk has any untouched children, then at step 606 the touch-traversal operation proceeds to one of the untouched children.

In the present example, the touch-traversal operation has visited chunk 112, but has not visited the other children (chunks 114 and 128) of chunk 104. Therefore, at step 606, the touch-traversal operation may proceed to chunk 114. After traversing to a child, control proceeds back to step 620.

At step 620, the STT cache is checked for an entry for the current chunk (i.e. chunk 114). If there is no entry, then control passes to step 602. If there is an entry, but the sub-tree-timestamp in the entry is before D, then control also passes to step 602.

For the purpose of discussion, it shall be assumed that the STT cache has an entry for chunk 114, and that the entry has a sub-tree-timestamp that is more recent than N. That means that chunk 114, and all chunks that reside below chunk 114 in the hierarchy, have last-touched timestamps that are more recent than N. Consequently, those chunks will be skipped in the sweep phase even if not re-touched during the current trace phase. Because those chunks are already "safe" from being reclaimed, no further touch-traversal operation of that sub-tree is performed, and control passes to step 612.

At step 612, it is determined whether the current chunk is the root chunk (i.e. a chunk that has no parent). If the chunk is not the root chunk, then at step 614 the touch-traversal operation proceeds up the tree to the current chunk's parent. On the other hand, if the current chunk is the root chunk, then control proceeds to step 600 and a new root is selected using the name store.

In the present example, the current chunk (chunk 114) is not the root chunk, so control proceeds to step 614 where the touch-traversal operation returns back to chunk 104. Control then proceeds to step 604. At step 604, a determination is made as to whether the current chunk (i.e. chunk 104) has any untouched children. If the chunk has any untouched children, then at step 606 the touch-traversal operation proceeds to one of the untouched children.

In the present example, the touch-traversal operation has visited chunks 112, and 114, but has not visited chunk 128. Therefore, at step 606, the touch-traversal operation may proceed to chunk 128. After traversing to a child, control proceeds back to step 620.

At step 620, the STT cache is checked for an entry for the current chunk (i.e. chunk 128). If there is no entry, then control passes to step 602. If there is an entry, but the sub-tree-timestamp in the entry is before D, then control also passes to step 602.

For the purpose of discussion, it shall be assumed that the STT cache has no entry for chunk 128. Therefore, control passes to step 602. At step 602, chunk 128 is touched. After the chunk is touched, at step 604, a determination is made as to whether the chunk has any untouched children. If the chunk has any untouched children, then at step 606 the touch-traversal operation proceeds to one of the untouched children.

In the present example, the touch-traversal operation has not yet touched chunk 130, the one child of chunk 128. Therefore, at step 606, the touch-traversal operation may proceed to chunk 130. After traversing to a child, control proceeds back to step 620.

At step 620, the STT cache is checked for an entry for the current chunk (i.e. chunk 130). If there is no entry, then control passes to step 602. If there is an entry, but the sub-tree-timestamp in the entry is before D, then control also passes to step 602.

For the purpose of discussion, it shall be assumed that the STT cache has no entry for chunk 130. Therefore, control passes to step 602. At step 602, chunk 130 is touched. After the chunk is touched, at step 604, a determination is made as to whether the chunk has any untouched children. If the chunk has any untouched children, then at step 606 the touch-traversal operation proceeds to one of the untouched children.

In the present example, chunk 130 has no children, therefore, control proceeds to step 612. At step 612, it is determined whether the current chunk is the root chunk (i.e. a chunk that has no parent). If the chunk is not the root chunk, then at step 614 the touch-traversal operation proceeds up the tree to the current chunk's parent. On the other hand, if the current chunk is the root chunk, then control proceeds to step 600 and a new root is selected using the name store.

In the present example, the current chunk (chunk 130) is not the root chunk, so control proceeds to step 614 where the touch-traversal operation returns back to chunk 128. Control then proceeds to step 604. At step 604 a determination is made as to whether the current chunk (i.e. chunk 128) has any untouched children. If the chunk has any untouched children, then at step 606 the touch-traversal operation proceeds to one of the untouched children.

In the present example, the touch-traversal operation has visited all children of chunk 128. Therefore, control proceeds to step 612. At step 612, it is determined whether the current chunk is the root chunk (i.e. a chunk that has no parent). If the chunk is not the root chunk, then at step 614 the touch-traversal operation proceeds up the tree to the current chunk's parent. On the other hand, if the current chunk is the root chunk, then control proceeds to step 600 and a new root is selected using the snapshot.

In the present example, the current chunk (chunk 128) is not the root chunk, so control proceeds to step 614 where the touch-traversal operation returns back to chunk 104. Control then proceeds to step 604. At step 604 a determination is made as to whether the current chunk (i.e. chunk 128) has any untouched children. If the chunk has any untouched children, then at step 606 the touch-traversal operation proceeds to one of the untouched children.

In the present example, the touch-traversal operation has visited all children of chunk 104. Therefore, control proceeds to step 612. At step 612, it is determined whether the current chunk is the root chunk (i.e. a chunk that has no parent). If the chunk is not the root chunk, then at step 614 the touch-traversal operation proceeds up the tree to the current chunk's parent. On the other hand, if the current chunk is the root chunk, then control proceeds to step 600 and a new root is selected using the name store.

In the present example, the current chunk (chunk 104) is the root chunk, so control passes to step 600 where a new root is selected. The next root selected may be, for example, chunk 106 which serves as the root of the tree associated with Mary's files. This tree is traversed in the same manner as Jack's tree, as described above.

As is illustrated by the example just given, the work involved in the trace phase of a garbage collection process may be significantly decreased by use of the STT cache. Specifically, rather than having to traverse the entire tree rooted at chunk 104 to touch eleven chunks, only three chunks (chunks 104, 128 and 130) had to be touched. The STT cache was used to determine that the remaining eight chunks had last-touched times that were recent enough to survive a garbage collection operation that is based on time D, and therefore did not have to be visited or touched during the trace phase of the garbage collection operation.

Alternative Approaches for the Trace Phase

Figure 7:
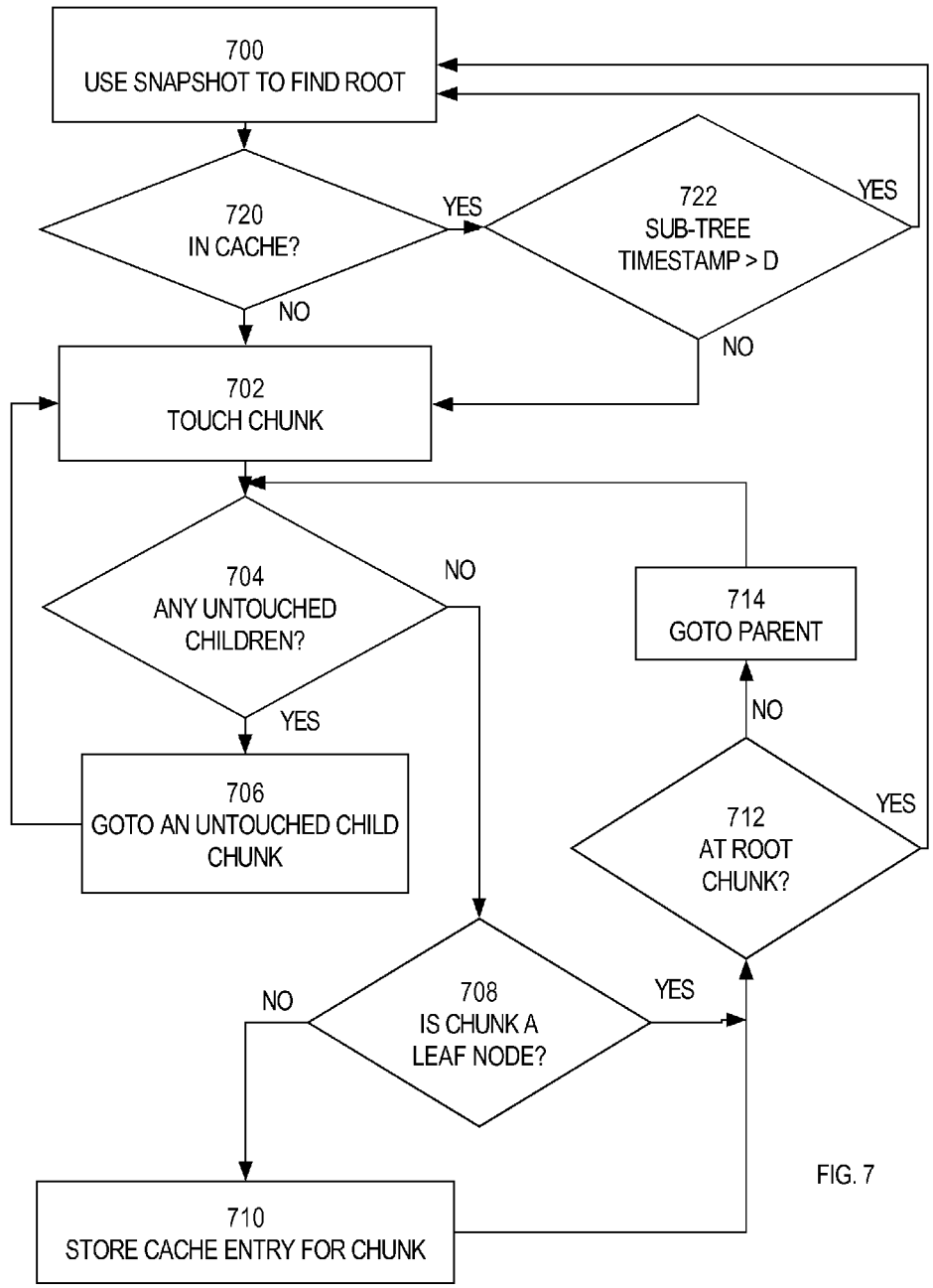
FIG. 7 is a flowchart illustrating steps for using a last-touched timestamp cache, according to an alternative embodiment.

In the embodiment illustrated in FIG. 6, the STT cache is checked before traversing down any chunk. However, in alternative embodiments, the STT cache may be checked less frequently. For example, in one embodiment, the STT cache is only checked if the current node is a non-leaf node. In yet another embodiment, the STT cache may be checked only for nodes that root an entire tree of the file hierarchy. FIG. 7 is a flowchart illustrating the trace phase of an embodiment in which the STT cache is only checked for root nodes.

Referring to FIG. 7, at step 700, a root is selected based on a snapshot. At step 720, it is determined whether the STT cache has an entry for the root. If the STT cache has an entry for the root, and at step 722 it is determined that the sub-tree-timestamp in the entry is greater than D, then control passes back to step 700, and another root is chosen. In other words, if the root of a tree has an entry in the STT cache that has a sub-tree-timestamp more recent than D, then the entire tree below that root is skipped during the trace phase of the garbage collection operation.

Otherwise, if the root has no entry in the STT cache, or the sub-tree-timestamp for the entry is not after D, then the tree is processed as previously described with respect to FIG. 5. Specifically, steps 702, 704, 706, 708, 710, 712 and 714 define a touch-traversal operation that touches all chunks in the tree, and stores cache entries for non-leaf nodes whenever traversal of the entire sub-tree below the nodes has been completed.

Reducing Snapshots

According to one embodiment, the amount of work involved in generating snapshots is reduced through the use of incremental snapshots. An incremental snapshot is a snapshot that only includes name-to-chunk mappings that change since the previous snapshot. For example, assume that at time T1, the name stores has the following name-to-chunk mappings:
file1=>hash of chunk1
file2=>hash of chunk2
file3=>hash of chunk3
file4=>hash of chunk4
file5=>hash of chunk5
file6=>hash of chunk6

Thus, a full snapshot of the name store taken at time T1 would include those same mappings. Further assume that between time T1 and a later time T2, the file2 and file5 are updated. Consequently, at time T2, the current state of the name store will be:
file1=>hash of chunk1
file2=>hash of chunk7
file3=>hash of chunk3
file4=>hash of chunk4
file5=>hash of chunk8
file6=>hash of chunk6

However, rather than take a full snapshot of the file store at time T2, an incremental snapshot is taken. The content of the incremental snapshot would be:
file2=>hash of chunk7
file5=>hash of chunk8

For the purpose of explanation, assume further that between time T2 and time T3, file6 is modified such that the incremental snapshot for time T3 is:
file6=>hash of chunk6

When incremental snapshots are used in this manner, the current state of the name store at any given snapshot time may be reconstructed based on full snapshot that precedes that time, and all incremental snapshots up to and including that time. For example, the state of the name store at time T2 may be reconstructed by combining snapshot T2 and snapshot T1, and the stat of the name store at time T3 may be reconstructed by combining snapshots T3, T2 and T1.

When combining snapshots in this manner to reproduce the state of the name store, if the same file appears in more than one snapshot, the entry in the most recent of those snapshots is used. For example, when combining snapshots T3, T2 and T1, entries for "file2" and "file5" appear in both snapshot T1 and snapshot T2. Since snapshot T2 is more recent than snapshot T1, the entries in snapshot T2 are used. Similarly, an entry for "file6" appears in both snapshot T3 and snapshot T1. Since snapshot T3 is more recent than snapshot T1, the entry for "file6" in T3 is used.

Snapshots may be combined in this manner to create the snapshot upon which a garbage collection operation is based. For example, assume that a garbage collection operation is going to collect garbage as of a time D that is between times T2 and T3. Under these circumstances, the state of the name store at time T3 must be used to perform the trace phase, because times T1 and T2 are before time D. Under these circumstances, snapshots T1, T2 and T3 may be combined to create a full snapshot as of time T3, and that full snapshot may be used to perform the trace phase of the garbage collection operation.

According to one embodiment, after reconstructing the state of the name store as of a particular time, the resulting full snapshot may be saved as the snapshot for that time. For example, after creating the full snapshot for time T3 by combining the full snapshot of time T1 with the incremental snapshots of times T2 and T3, the resulting full snapshot may be saved as the snapshot for time T3.

By periodically creating new full snapshots, the number of snapshots that need to be combined to reconstruct the state of the name store is reduced. For example, assume that an incremental snapshot is made at time T4, and that a subsequent garbage collection operation is going to use the state of the name store at T4 as the basis for a trace phase. Because a full snapshot exists at time T3, the state of the name store may be reconstructed based solely on the full snapshot at time T3, and the incremental snapshot at time T4. If the full snapshot at time T3 had not been created, the state of the name store at time t4 would require combining the full snapshot of time T1 with incremental snapshots T2, T3, and T4.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
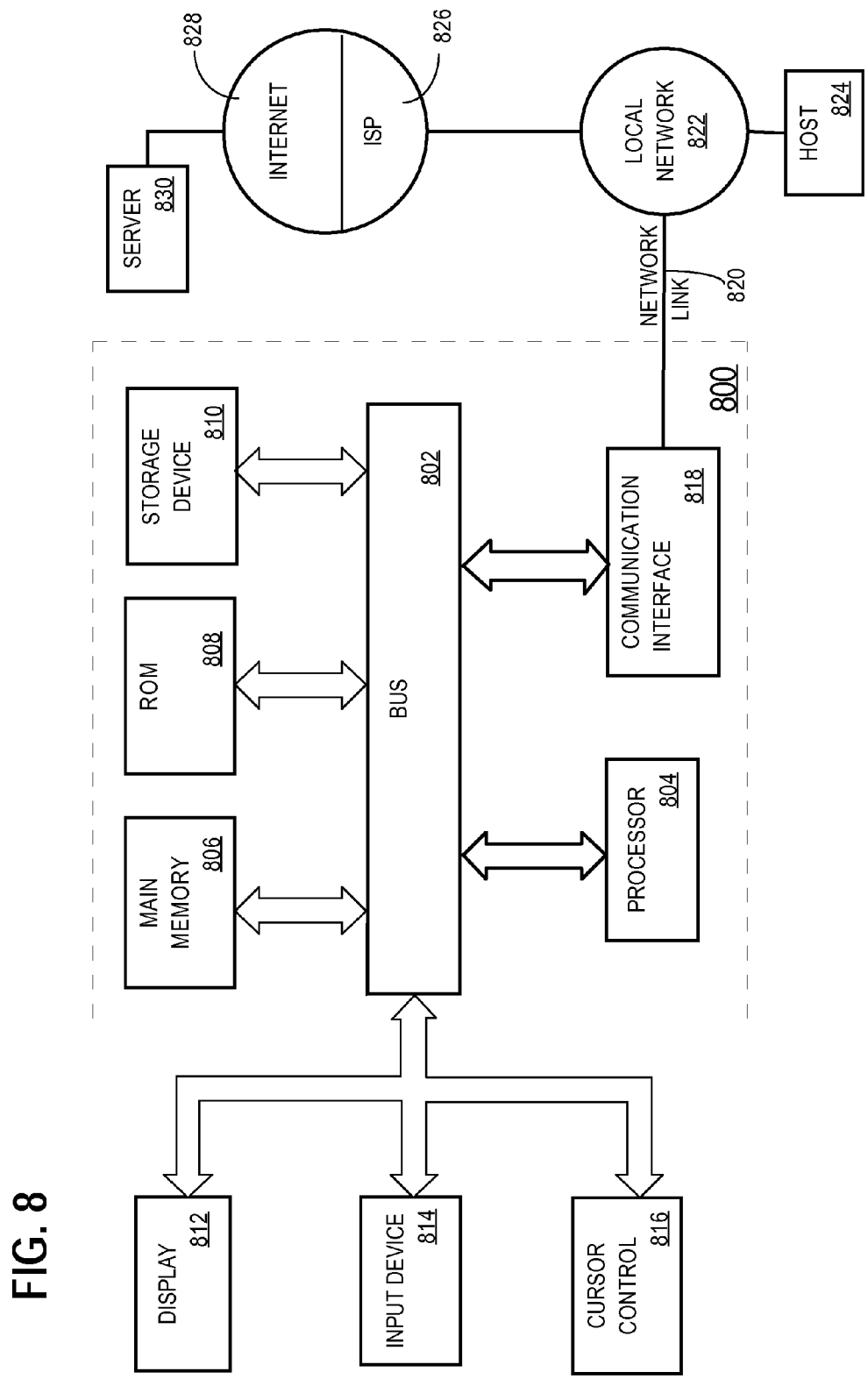
FIG. 8 is a block diagram of a computer system that may be used to implement embodiments of the invention.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    implementing a hierarchical file system that supports modifications using chunks stored in a content addressable storage system, wherein at least a portion of the chunks represents file content;
    wherein making a modification in the hierarchical file system comprises storing one or more new chunks in the content addressable storage system that represent the hierarchical file system structure after the modification;
    performing a garbage collection operation that reclaims stale chunks, within the content addressable storage system, that no longer reflect a current state of the hierarchical file system as of a first particular time due to one or more modifications in the hierarchical file system;

wherein performing the garbage collection operation includes:

during a trace phase of the garbage collection operation, performing one or more recursive touch-traversal operations to establish new last-touched timestamps for chunks visited during the recursive touch-traversal operations;

wherein each of the one or more recursive touch-traversal operations is initiated at a distinct chunk that, as of a second particular time that is later than the first particular time, was a current root of a corresponding tree within the hierarchical file system;

during the trace phase, determining whether to initiate a particular recursive touch-traversal operation at a particular chunk, which was the current root of a particular tree within the hierarchical file system as of the second particular time, based, at least in part, on a sub-tree-timestamp maintained for the particular tree;

responsive to the sub-tree-timestamp of the particular tree being before the first particular time, initiating the particular recursive touch-traversal operation at the particular chunk;

responsive to the sub-tree-timestamp of the particular tree being after the first particular time, performing the trace phase without initiating any recursive touch-traversal operation at the particular chunk;

during a sweep phase, reclaiming chunks, within the content addressable storage system, that have last-touched timestamps that are before the first particular time;

wherein the method is performed by one or more computing devices.

2. The method of claim 1 further comprising:

prior to performing the garbage collection operation, performing a first recursive touch-traversal operation that starts at the particular chunk;

in response to the first recursive touch-traversal operation being completed for the particular tree, storing a cache entry for the particular chunk;

wherein the cache entry indicates the last-touched timestamp assigned to the particular chunk during the first recursive touch-traversal operation; and wherein the step of determining whether to initiate the particular recursive touch-traversal operation is based on the last-touched timestamp indicated in the cache entry.

3. The method of claim 2, wherein:

the cache entry is one of a plurality of cache entries in a cache;

each cache entry, of the plurality of cache entries:

was added to the cache in response to a recursive touch-traversal operation touching all chunks in a corresponding tree or sub-tree of the hierarchical file system;

identifies the chunk that is the root of the corresponding tree of sub-tree; and includes a sub-tree-timestamp that is the same as or earlier than the last-touched timestamp of any chunk of the corresponding tree or sub-tree.

4. The method of claim 2 wherein the first recursive touch-traversal operation is a touch-traversal operation that is performed pro-actively independent of any sweep phase operation.

5. The method of claim 4 wherein initiation of the first recursive touch-traversal operation was triggered, at least in part, based on how much time had passed since performance of a previous pro-actively performed touch-traversal operation.

6. The method of claim 4 wherein initiation of the first recursive touch-traversal operation was triggered, at least in part, based on system conditions.

7. The method of claim 1 further comprising:

maintaining file-to-chunk mappings for the hierarchical file system in a name store;

creating a plurality of snapshots of the name store, wherein each snapshot of the plurality of snapshots reflects the name store at a distinct point in time;

selecting a particular snapshot, of the plurality of snapshots, that reflects the name store as of the second particular time; and during the trace phase of the garbage collection operation, using the particular snapshot to identify chunks that, as of the second particular time, were current roots of corresponding trees within the hierarchical file system.

8. The method of claim 7 wherein:

the plurality of snapshots include one or more full snapshots and one or more incremental snapshots; and the method further comprises creating the particular snapshot by combining a full snapshot with at least one incremental snapshot made subsequent to the full snapshot.

9. The method of claim 1 wherein at least one chunk belongs to multiple distinct trees within the hierarchical file system.

10. A method comprising:

implementing a hierarchical file system that supports modifications using chunks stored in a content addressable storage system, wherein at least a portion of the chunks represents file content;

wherein making a modification in the hierarchical the system comprises storing one or more new chunks in the content addressable storage system that represent the hierarchical file system structure after the modification;

maintaining file-to-chunk mappings for the hierarchical file system in a name store;

creating a plurality of snapshots of the name store, wherein each snapshot of the plurality of snapshots reflects the name store at a distinct point in time;

performing a garbage collection operation that reclaims stale chunks, within the content addressable storage system, that no longer reflect a current state of the hierarchical file system as of a first particular time due to one or more modifications in the hierarchical file system;

wherein performing the garbage collection operation includes:

selecting a particular snapshot, of the plurality of snapshots, that reflects the name store as of a second particular time that is after the first particular time;

during a trace phase of the garbage collection operation, using the particular snapshot to identify chunks that, as of the second particular time, were current roots of corresponding trees within the hierarchical file system;

during the trace phase of the garbage collection operation, performing one or more recursive touch-traversal operations to establish new last-touched timestamps for chunks visited during the recursive touch-traversal operations;

wherein each of the one or more recursive touch-traversal operations is initiated at a distinct chunk identified using the particular snapshot;

during a sweep phase, reclaiming chunks, within the content addressable storage system, that have last-touched timestamps that are before the first particular time;

wherein the method is performed by one or more computing devices.

11. The method of claim 10 wherein:

the plurality of snapshots include one or more full snapshots and one or more incremental snapshots;

the method further comprises creating the particular snapshot by combining a full snapshot with at least one incremental snapshot made subsequent to the full snapshot; and the at least one incremental snapshot includes an incremental snapshot associated with the second particular time.

12. The method of claim 10 further comprising allowing updates to be made to the hierarchical file system during the trace phase.

13. One or more non-transitory computer-readable media storing instructions which, when executed by one or more processors, cause the one or more processors to perform a method comprising the steps of:

implementing a hierarchical file system that supports modifications using chunks stored in a content addressable storage system, wherein at least a portion of the chunks represents file content;

wherein making a modification in the hierarchical file system comprises storing one or more new chunks in the content addressable storage system that represent the hierarchical file system structure after the modification;

performing a garbage collection operation that reclaims stale chunks, within the content addressable storage system, that no longer reflect a current state of the hierarchical file system as of a first particular time due to one or more modifications in the hierarchical file system;

wherein performing the garbage collection operation includes:

during a trace phase of the garbage collection operation, performing one or more recursive touch-traversal operations to establish new last-touched timestamps for chunks visited during the recursive touch-traversal operations;

wherein each of the one or more recursive touch-traversal operations is initiated at a distinct chunk that, as of a second particular time that is later than the first particular time, was a current root of a corresponding tree within the hierarchical file system;

during the trace phase, determining whether to initiate a particular recursive touch-traversal operation at a particular chunk, which was the current root of a particular tree within the hierarchical file system as of the second particular time, based, at least in part, on a sub-tree-timestamp maintained for the particular tree;

responsive to the sub-tree-timestamp of the particular tree being before the first particular time, initiating the particular recursive touch-traversal operation at the particular chunk;

responsive to the sub-tree-timestamp of the particular tree being after the first particular time, performing the trace phase without initiating any recursive touch-traversal operation at the particular chunk;

during a sweep phase, reclaiming chunks, within the content addressable storage system, that have last-touched timestamps that are before the first particular time.

14. The one or more non-transitory computer-readable media of claim 13, wherein the method further comprises:

prior to performing the garbage collection operation, performing a first recursive touch-traversal operation that starts at the particular chunk;

in response to the first recursive touch-traversal operation being completed for the particular tree, storing a cache entry for the particular chunk;

wherein the cache entry indicates the last-touched timestamp assigned to the particular chunk during the first recursive touch-traversal operation; and wherein the step of determining whether to initiate the particular recursive touch-traversal operation is based on the last-touched timestamp indicated in the cache entry.

15. The one or more non-transitory computer-readable media of claim 14, wherein:

the cache entry is one of a plurality of cache entries in a cache;

each cache entry, of the plurality of cache entries:

was added to the cache in response to a recursive touch-traversal operation touching all chunks in a corresponding tree or sub-tree of the hierarchical file system;

identifies the chunk that is the root of the corresponding tree of sub-tree; and includes a sub-tree-timestamp that is the same as or earlier than the last-touched timestamp of any chunk of the corresponding tree or sub-tree.

16. The one or more non-transitory computer-readable media of claim 14 wherein the first recursive touch-traversal operation is a touch-traversal operation that is performed pro-actively independent of any sweep phase operation.

17. The one or more non-transitory computer-readable media of claim 16 wherein initiation of the first recursive touch-traversal operation was triggered, at least in part, based on how much time had passed since performance of a previous pro-actively performed touch-traversal operation.

18. The one or more non-transitory computer-readable media of claim 16 wherein initiation of the first recursive touch-traversal operation was triggered, at least in part, based on system conditions.

19. The one or more non-transitory computer-readable media of claim 13 wherein the method further comprises:

maintaining file-to-chunk mappings for the hierarchical file system in a name store;

creating a plurality of snapshots of the name store, wherein each snapshot of the plurality of snapshots reflects the name store at a distinct point in time;

selecting a particular snapshot, of the plurality of snapshots, that reflects the name store as of the second particular time; and during the trace phase of the garbage collection operation, using the particular snapshot to identify chunks that, as of the second particular time, were current roots of corresponding trees within the hierarchical file system.

20. The one or more non-transitory computer-readable media of claim 19 wherein:

the plurality of snapshots include one or more full snapshots and one or more incremental snapshots; and the method further comprises creating the particular snapshot by combining a full snapshot with at least one incremental snapshot made subsequent to the full snapshot.

21. One or more non-transitory computer-readable media storing instructions which, when executed by one or more processors, cause the one or more processors to perform a method comprising the steps of:

implementing a hierarchical file system that supports modifications using chunks stored in a content addressable storage system, wherein at least a portion of the chunks represents file content;

wherein making a modification in the hierarchical file system comprises storing one or more new chunks in the content addressable storage system that represent the hierarchical file system structure after the modification;

maintaining file-to-chunk mappings for the hierarchical file system in a name store;

creating a plurality of snapshots of the name store, wherein each snapshot of the plurality of snapshots reflects the name store at a distinct point in time;

performing a garbage collection operation that reclaims stale chunks, within the content addressable storage system, that no longer reflect a current state of the hierarchical file system as of a first particular time due to one or more modifications in the hierarchical file system;

wherein performing the garbage collection operation includes:

selecting a particular snapshot, of the plurality of snapshots, that reflects the name store as of a second particular time that is after the first particular time;

during a trace phase of the garbage collection operation, using the particular snapshot to identify chunks that, as of the second particular time, were current roots of corresponding trees within the hierarchical file system;

during the trace phase of the garbage collection operation, performing one or more recursive touch-traversal operations to establish new last-touched timestamps for chunks visited during the recursive touch-traversal operations;

wherein each of the one or more recursive touch-traversal operations is initiated at a distinct chunk identified using the particular snapshot; and during a sweep phase, reclaiming chunks, within the content addressable storage system, that have last-touched timestamps that are before the first particular time.

22. The one or more non-transitory computer-readable media of claim 21 wherein:

the plurality of snapshots include one or more full snapshots and one or more incremental snapshots;

the method further comprises creating the particular snapshot by combining a full snapshot with at least one incremental snapshot made subsequent to the full snapshot; and the at least one incremental snapshot includes an incremental snapshot associated with the second particular time.

23. The one or more non-transitory computer-readable media of claim 21 wherein the method further comprises allowing updates to be made to the hierarchical file system during the trace phase.

* * * * *